April 21, 1925.  1,534,698

F. GANSERT ET AL

METHOD OF AND APPARATUS FOR MAKING PAPER BOX CAPS

Filed Nov. 3, 1922

INVENTOR
F. Gansert
H. Gansert Jr.
BY
ATTORNEY.

Patented Apr. 21, 1925.

1,534,698

UNITED STATES PATENT OFFICE.

FRED GANSERT AND HERMAN GANSERT, JR., OF SYRACUSE, NEW YORK.

METHOD OF AND APPARATUS FOR MAKING PAPER-BOX CAPS.

Application filed November 3, 1922. Serial No. 598,952.

*To all whom it may concern:*

Be it known that we, FRED GANSERT and HERMAN GANSERT, Jr., of Syracuse, in the county of Onondaga, in the State of New York, have invented new and useful Improvements in Methods of and Apparatus for Making Paper-Box Caps, of which the following, taken in connection with the accompanying drawings, is a full, clear, and exact description.

This invention relates to a method of and apparatus for making paper box caps and analogous articles in which the edges are turned or pressed up to form a marginal flange.

The main object is to provide simple and efficient means whereby articles of this character may be expeditiously pressed or molded to the desired form from dry paper, cardboard or equivalent material without liability of breaking or otherwise mutilating any part of the completed cap.

One of the specific objects is to provide the device with a resilient ring of rubber or equivalent elastic material capable of being contracted against the periphery of the flange during the cupping operation and by the same pressure employed for cutting and cupping the blanks.

In other words, we have sought to cut the blanks from the sheet, press the blank into cup shape, to press the flange of the cup inwardly against the male cupping die and expel the completed cap, all in one and the same operation.

Other objects and uses relating to specific parts of the device will be brought out in the following description.

Figure 1:
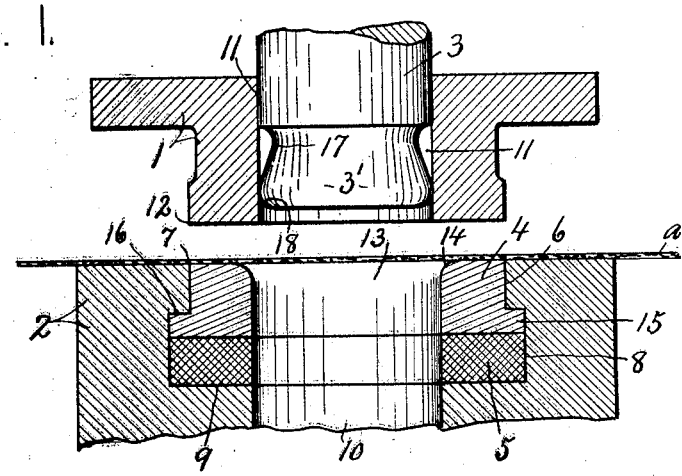
Figure 2:
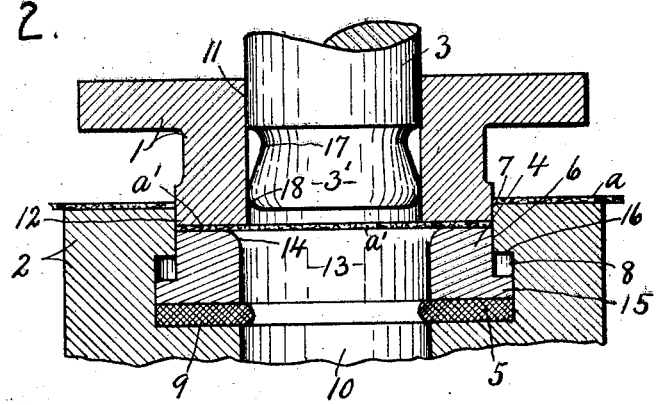
Figure 3:
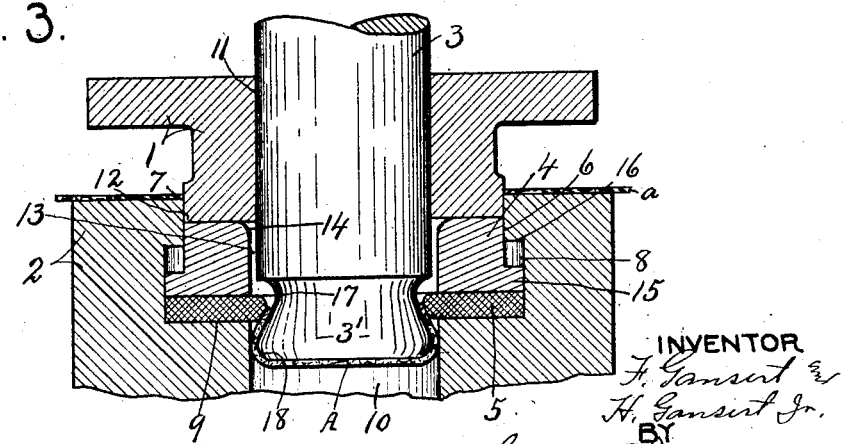

In the drawings, Figures 1, 2, and 3 are sectional views of an apparatus for carrying out the object of my invention, showing the successive steps of the process.

As illustrated, this device comprises co-operative blanking dies —1— and —2—, additional cooperative cupping dies —3— and —4— and a resilient or elastic compression ring —5— against which the cupping die —4— is seated for a purpose hereinafter described.

These dies are preferably hollow and relatively movable telescopically one within the other and are preferably disposed in their vertical position with their openings in alinement.

The female blanking die —2— may be fixed to any suitable support not shown and is preferably made of steel and provided with a central opening —6— of any suitable size, form or contour corresponding to that required for the article to be formed, but its walls are preferably parallel vertically so that the upper portions thereof may form a marginal cutting or shearing edge —7— the latter being hardened for greater cutting efficiency against wear.

The lower end of the opening —6— is preferably enlarged to form a socket —8— and a seat —9— surrounding the central opening as —10— which is of less cross sectional area than the opening —6— and socket —8— to form the seat —9—.

The upper male blanking die —1— is movable vertically into and out of the opening —6— and is provided with a central opening —11— and a hardened marginal lower cutting edge —12— of substantially the same cross sectional form and size as that of the opening —6— for shearing coaction with the cutting edge —7— of the female die —2— whereby when the two dies are brought together in cutting coaction upon a sheet as "*a*" of cardboard or equivalent material from which the cap is to be formed will cause the severing of a blank as "*a'*" from the sheet preparatory to pressing the same into cup shape form.

The resilient or elastic ring —5— is preferably made of soft rubber or equivalent material of substantially the same cross sectional size and form as the socket —8— and is supported against the seat —9— of the blank die —2— with its periphery or perimeter against the outer walls of the socket —8— where it is held against outward expansion, the inner diameter of the ring being normally of substantially the same cross sectional form and area of the central opening —10— for a purpose hereinafter described.

The female cupping die —4— is slidable endwise telescopically within the opening —6— and socket —8— and is seated upon the upper face of the resilient cushioning member or ring —5— and is provided with a central opening —13— of substantially the same cross sectional form and area as that of the opening —10— with which it is alined although its upper edge is slightly flared at —14— to facilitate the entrance of the blank thereinto by downward pressure of the male cupping die —3— as will be hereinafter more fully explained.

The exterior form and size of the outer end of the die —4— is substantially the same as that of the opening —6— of the female die —2— in which it is movable but the inner end thereof is enlarged to form a marginal flange —15— which is movable in the socket —8— and cooperates with a shoulder —16— on the die —2— to hold the die —4— against upward displacement.

The flange —15— is yieldingly held against the shoulder —16— by the resiliency of the cushioning ring —5— and when the parts are properly assembled the upper face of the cupping die —4— is disposed in substantially the same plane as that of the die —2— to permit the sheet "a" to lie flatwise upon both dies —2— and —4— as shown in Figure 1.

The male cupping die —3— is slidable vertically and telescopically within the opening —11— of the upper blanking die —1— and together with said opening —11— are of approximately the same cross sectional size and form as that of the openings —10— and —13— with just sufficient clearance to receive the marginal edges or flange of the cap during the cupping operation.

The lower end as —3'— of the die —3— is preferably bell shaped or slightly contracted at —17— so that the sides of the bell shaped portion are tapered upwardly to permit the marginal edges of the flange of the cap to be pressed inwardly therearound by the inward contract of the elastic ring —5— when the blank is forced therethrough by the downward movement of the plunger die —3— in the act of cupping the blank. The lower marginal edge as —18— of the die —3— is preferably rounded to cooperate with the rounded corner —14— on the die —4— in preventing the breaking or mutilation of the cap as the blank is forced into the opening —13— by the die —3—.

The several dies are made of suitable metal such as steel hardened, where necessary to reduce wear and may be mounted in any suitable supports not necessary to herein illustrate or describe, whereby they may be held in operative relation.

*Operation*

The sheet or strip of paper, cardboard or equivalent material from which the box cap is to be formed is placed in a dry condition over and upon the upper faces of the dies —2— and —4— after which the male blanking die —1— is forced downwardly into shearing coaction with the die —2— to cut the blank as "a'" from the sheet and to impinge its marginal edges between the meeting faces of the blanking die —1— and cupping die —4—.

The downward pressure of the die —1— against the blank on the die —4— forces the last named die downwardly against the resilient action of the ring —5— thereby compressing said ring and causing it to contract inwardly beyond the walls of the openings —10— and —13— as shown in Figures —2— and —3— by reason of the fact that the walls of the socket —8— firmly holds the ring against outward expansion.

While the elastic ring —5— is under compression and contracted inwardly, the male cupping plunger —3— is forced downwardly against the central portion of the blank a sufficient distance to draw the marginal edges of the blank from between the meeting faces of the dies —1— and —4— through the contracted opening in the resilient ring —5— which yields radially under this pressure and causes the inward contracting portions of the ring to impinge against the upturned marginal flange of the cap as A thereby forcing said flange against the tapered sides of the die —3— so that when the flange is under pressure of the resilient ring —5— its free edge will be slightly contracted to less size than its body portion, the object of which is to assure the upstanding of the flange when the cap is expelled from the machine.

That is, after the cap has been thus formed, the downward movement of the plunger is continued a sufficient distance to carry the cap below the ring —5— where it is discharged downwardly through the opening —10— it being understood that as soon as the cap has been formed and forced below the ring —5— the plunger —3— is withdrawn upwardly while the friction of the ring with the upper edge of the flange of the cap assists in displacing the cap from the plunger owing to the tendency of the flange to expand after leaving the ring and consequently, to reduce the friction between the cap and lower end of the die.

After the die —3— has been withdrawn upwardly, the die —1— is similarly raised out of the die —2— to permit the sheet "a" to be moved to another position ready for a repetition of the operation previously described.

I claim:

1. An apparatus for making paper box caps comprising coaxial axially movable cupping dies, and a resilient supporting ring for one of the dies compressible axially thereby and contractible inwardly by said compression to press the marginal flange of the cap inwardly during the cupping process.

2. An apparatus for making paper box caps as in claim 1 including an axially movable blank-forming die cooperating with one of the cupping dies to hold the blank between them and to force the last named cupping die axially for compressing said ring.

3. An apparatus for making cup-shaped caps as in claim 1 including cooperative blanking dies, one of which forms a support and guide for one of the cupping dies and the axially compressible ring.

4. An apparatus for making paper box caps comprising coaxial axially movable cupping dies and a soft rubber ring supporting the female die and adapted to project beyond the inner surface of said die when compressed thereby.

5. In a machine for making paper box-caps, cooperative blanking dies, cupping dies telescopically movable one within the other and within the blanking dies, and a soft rubber cushion seat for the female cupping die compressible axially and contractible inwardly by its axial compression for yieldingly pressing the marginal flange of the cap against the periphery of the male cupping die.

6. In a machine for making paper box-caps, a resilient ring compressible axially and contractible inwardly by axial pressure, cooperative members for holding the marginal edges of a cap blank between them and movable together for compressing the ring axially and contracting it inwardly, and a cupping die for withdrawing the blank from between said members and forcing it through the contracted resilient ring for cupping the blank.

In witness whereof we have hereunto set our hands this 1st day of November 1922.

FRED GANSERT.
HERMAN GANSERT, Jr.

Witnesses:
E. M. Fradenburgh,
H. E. Chase.